April 3, 1928.
A. W. POPE, JR
1,664,942
ENGINE BALANCING SYSTEM
Filed Oct. 13, 1926
Fig. 1.
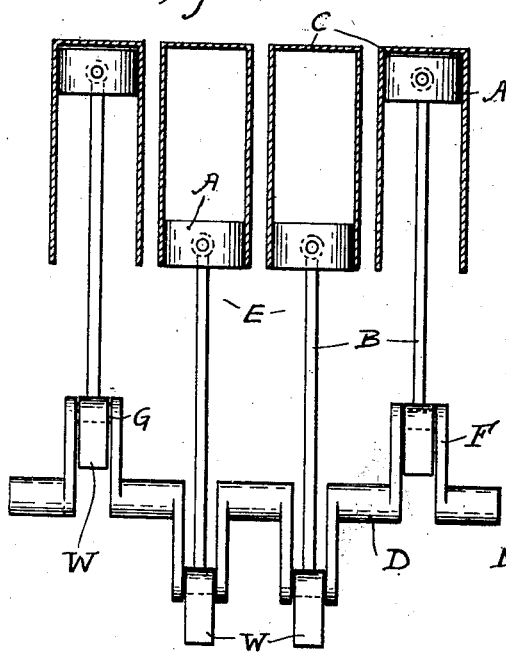
Fig. 2.
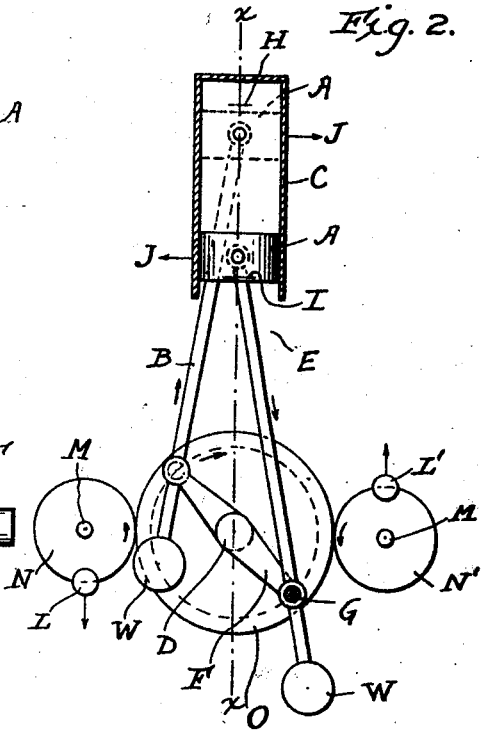
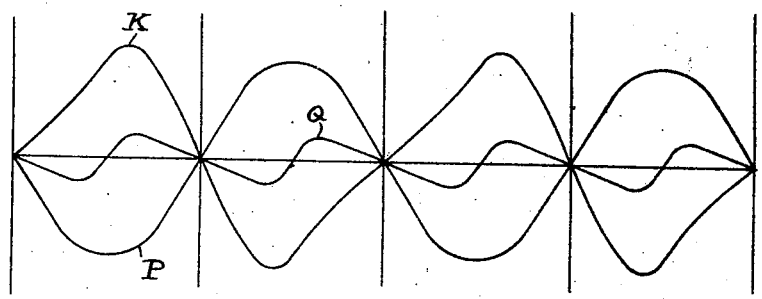
Fig. 3.
Inventor,
Arthur W. Pope Jr.
By Brown, Boettcher & Dienner
Attys.

Patented Apr. 3, 1928.

1,664,942

UNITED STATES PATENT OFFICE.

ARTHUR W. POPE, JR., OF WAUKESHA, WISCONSIN, ASSIGNOR TO WAUKESHA MOTOR COMPANY, OF WAUKESHA, WISCONSIN, A CORPORATION OF WISCONSIN.

ENGINE-BALANCING SYSTEM.

Application filed October 13, 1926. Serial No. 141,252.

My invention relates to engine balancing systems, particularly useful and efficient in connection with four-cylinder internal combustion engines.

In the conventional four-cylinder engines there are inherent unbalanced forces. Some of these forces are applied on the crank shaft and are due to what is commonly spoken of as the angularity of the connecting rods, that is, the difference in the angularity of the connecting rods during the upper half and the lower half of the stroke of the piston travel which causes the pistons and rods on the upper half of the stroke to travel faster in the vertical direction than the opposite set of pistons and rods on the bottom half of the stroke. The forces moving the upper pair of pistons and rods must therefore be different from the forces moving the lower pair of pistons and rods, and difference in these forces causes an unbalanced condition in the engine.

Other unbalanced forces in the engine are set up by the side thrust of the pistons on the cylinder walls due to the angular movement of the connecting rod assemblies about the crank pin. The unbalancing force is in the form of a reversing couple which occurs four times during each revolution of the crank shaft.

The important object of my invention is to provide an arrangement or system for counteracting or balancing these unbalanced forces set up by the connecting rods and pistons of a four-cylinder engine to produce a balanced and smooth running engine structure. In connection with the unbalance on account of the different angularity of the connecting rods, I apply counterweights to bring the center of gravity of each piston and rod assembly to the crank pin so that the forces may dissipate themselves in the form of a rotative couple on the crank shaft.

In connection with the unbalance due to the side thrust of the pistons, I produce a reversing couple which occurs four times per revolution of the crank shaft for counteracting and balancing these piston thrust forces or couples.

On the drawing, Figure 1 is a side elevational view, more or less diagrammatic, of a four-cylinder engine;

Fig. 2 is a transverse sectional view more or less diagrammatic; and

Fig. 3 is a diagram of forces.

The engine frame is represented by E, the cylinders by C, the pistons by A, the connecting rods by B, the crank shaft by D, and the crank sections by F.

Referring to Fig. 2, the crank pins G travel a circular path whose axis lies in the center line X—X of the cylinders. On Fig. 2 a pair of pistons 180 degrees apart is shown, the respective crank pins being shown as 45 degrees away from the center line X—X, and the crank shaft rotating in the direction of the arrow. The upper and lower ends of the piston travel are indicated by the points H and I. The upper piston is traveling upwardly and the lower piston is traveling downwardly and it will be apparent that the upper piston is farther from the upper travel limit H than the lower piston is from the lower travel limit I. As it must take the same length of time to travel these two distances, it is evident that the forces moving the upper piston must be different from the forces moving the lower piston. It is this difference in forces that causes the unbalanced condition in the vertical plan of the engine. The unbalanced condition is not due to the weight of the pistons alone, but includes the vertical weight component of the entire piston and rod assembly whose center of gravity lies somewhere between the crank pin and the piston.

In accordance with my invention the center of gravity of each piston and rod assembly is shifted into coincidence with the respective crank pin center and this can be readily accomplished by applying counterweights W to the piston and rod assemblies. The showing of the counterweights on the figures is diagrammatic. In practice some practical way would be provided to apply the counterweights. For example, the lower half of each crank shaft bearing could be made of proper weight to bring the center of gravity of the respective assemblies into coincidence with the crank pin center. The paths of the centers of gravity of the piston and rod structures will now be a circle whose axis is concentric with the crank shaft so that all the forces set up by the rotative movement of the structures about the crank shaft center must be balanced. In other words, the forces dissipate themselves in the form of a rotative couple on the crank shaft.

The forces in the engine set up by the side thrust of the pistons are indicated by J. The thrust is due to the angular movement of the connecting rod assemblies about the crank pins, the forces forming a couple which is of greatest effect when the crank pins of the upper and lower pistons are near the 45 degree point. If it were not for the different angularities of the connecting rods for the upper and lower pistons the force of the couple during running of the engine would be represented by a sine curve. However, on account of the difference in angularity the curve representing the force is not quite a symmetrical sine curve. The curve is indicated by K in Fig. 3. When the pistons are at the extreme ends of their positions or are together at the center of the cylinders, the couple forces J will neutralize each other. Forces J reverse their directions four times for each revolution of the crank shaft and the couple is therefore a reversing couple. The disturbing or unbalancing effect of this side thrust couple can be balanced by the proper application of another couple. As shown such balancing couple is produced by the two equal weights L and L' eccentric relative to but revolving about the axes M and M' which are parallel with the crank shaft axis. The weights are rotated in the same direction and at twice engine speed, in other words, making two revolutions for each rotation of the crank shaft. Such speed relation may be accomplished as shown by mounting the weights on discs or gears N in driving relation with the disc or gear O on the crank shaft. The weights L and L' are 180 degrees apart, the acting force of the weights being on the radial lines through the centers of the weights and the supporting discs N. When the radial or force direction lines of the weights coincide, the resulting force will be zero, as the forces will neutralize each other. At all other times they will form a couple acting on the engine frame whose value will be the product of the centrifugal force of one of the weights and the perpendicular distance between the radial or force direction lines of the weights, such perpendicular distance varying as the sine of the angle of rotation of the supporting discs. The force of the couple will be indicated by the sine curve P and the couple force will be in direction to oppose or balance the couple formed by the forces J and represented by the curve K. The value of this couple is at all times the product of a force J and the perpendicular distance between the forces.

As before stated, the curve K is not a fully symmetrical sine curve on account of the connecting rod angularity differences. The couple force represented by the curve K will therefore not fully balance the couple of the forces J and there will be a slight unbalanced couple force remaining in the engine which is equal to the difference between the couple J—J and the couple L—L'. Such remaining couple will be extremely small and will reverse eight times for each crank shaft rotation, as indicated by the curve Q in Fig. 3. This couple could be practically eliminated by the addition of another pair of eccentric weights revolving at four times the crank shaft speed.

Thus by simple means the disturbing crank shaft forces are neutralized and the inertia reaction of the pistons against the cylinder walls is balanced.

I claim:—

1. In a multi-cylinder engine, the combination with the cylinders, crank shaft, and the piston-connecting rod structures, of eccentric weights revolvable in the same plane and in the same direction on axes of rotation parallel to the crank shaft and with a phase difference of 180°, and means for rotating said weights at a speed to produce a couple for opposing and counteracting the couple set up by the side thrust of the pistons on the cylinder walls due to the angular movement of the connecting rod assemblies about the crank pin axis.

2. In a four-cylinder engine, the combination with the cylinders, pistons, crank shaft, and connecting rod, of two eccentric weights revolvable in the same plane in the same direction on axes of rotation parallel to the crank shaft axis and with a phase difference of 180°, and means for rotating said weights at twice engine speed to produce a reversing couple for counteracting the unbalancing couple set up by the side thrust of the pistons on the cylinder walls due to the angular movement of the connecting rod structures about the crank pin axis.

3. In a reciprocating engine, means for counteracting the side thrust of the pistons on the cylinder walls comprising masses rotatably mounted with a phase difference of 180°, and means for rotating said masses in the same direction at twice the speed of revolution of the engine crank shaft.

4. In a four-cylinder engine, means for balancing the rolling couple set up by the inertia reaction of the piston against the cylinder walls comprising two masses revolvable as a couple through orbits 180° apart but in the same direction, and means for revolving said masses at twice the speed of revolution of the engine crank shaft.

In witness whereof, I hereunto subscribe my name this 8th day of October, 1926.

ARTHUR W. POPE, Jr.